(12) United States Patent
Stormon et al.

(10) Patent No.: US 7,286,647 B2
(45) Date of Patent: Oct. 23, 2007

(54) METHODS, SYSTEMS, AND COMPUTER PROGRAM PRODUCTS FOR PROVIDING CONFIGURABLE TELECOMMUNICATIONS DETAIL RECORD ADAPTER

(75) Inventors: Charles D. Stormon, Cazenovia, NY (US); Sanjay Ambardar, New Delhi (IN); Kuldeep Sharma, New Delhi (IN); Vijay Singh, Jhansi (IN)

(73) Assignee: Tekelec, Morrisville, NC (US)

( * ) Notice: Subject to any disclaimer, the term of this patent is extended or adjusted under 35 U.S.C. 154(b) by 235 days.

(21) Appl. No.: 11/037,532

(22) Filed: Jan. 18, 2005

(65) Prior Publication Data

US 2005/0213722 A1 Sep. 29, 2005

Related U.S. Application Data

(60) Provisional application No. 60/537,117, filed on Jan. 16, 2004.

(51) Int. Cl.
*H04M 1/24* (2006.01)
*H04M 3/08* (2006.01)
*H04M 3/22* (2006.01)

(52) U.S. Cl. .............................. 379/32.01; 379/32.03; 379/112.01; 379/126

(58) Field of Classification Search ................ 379/101, 379/32.01–3, 111, 112.01, 112.05–6, 112.08, 379/126, 133–134, 137, 139
See application file for complete search history.

(56) References Cited

U.S. PATENT DOCUMENTS

| | | | |
|---|---|---|---|
| 5,008,929 A | | 4/1991 | Olsen et al. |
| 5,438,570 A | | 8/1995 | Karras et al. |
| 5,592,530 A | | 1/1997 | Brockman et al. |
| 6,052,448 A | * | 4/2000 | Janning ................. 379/115.01 |
| 6,249,572 B1 | | 6/2001 | Brockman et al. |
| 6,282,267 B1 | * | 8/2001 | Nolting ................... 379/32.03 |
| 6,327,350 B1 | | 12/2001 | Spangler et al. |
| 6,351,453 B1 | * | 2/2002 | Nolting et al. .............. 370/234 |
| 6,359,976 B1 | * | 3/2002 | Kalyanpur et al. ......... 379/134 |
| 6,385,301 B1 | * | 5/2002 | Nolting et al. ........... 379/32.01 |
| 2003/0105850 A1 | | 6/2003 | Lean et al. |
| 2004/0008717 A1 | * | 1/2004 | Verma et al. ................ 370/432 |
| 2004/0114741 A1 | | 6/2004 | Ngo et al. |
| 2004/0120350 A1 | | 6/2004 | Moisey et al. |
| 2005/0003838 A1 | | 1/2005 | McCann et al. |

\* cited by examiner

*Primary Examiner*—Binh K. Tieu
(74) *Attorney, Agent, or Firm*—Jenkins, Wilson, Taylor & Hunt, P.A.

(57) ABSTRACT

Methods, systems, and computer program products for providing a configurable telecommunications detail record adapter are disclosed. In one method, a user defines input data formats and output data formats via a graphical user interface. The text entered by the user is converted into a configuration file. The configuration file is converted into source code, and the source code is automatically converted into an executable adapter instance. In this manner, different adapter instances may be quickly and easily created by the user to process different input telecommunications detail record formats, such as formats of different probe vendors.

32 Claims, 15 Drawing Sheets

METHODS, SYSTEMS, AND COMPUTER PROGRAM PRODUCTS FOR PROVIDING CONFIGURABLE TELECOMMUNICATIONS DETAIL RECORD ADAPTER

RELATED APPLICATIONS

This application claims the benefit of U.S. Provisional Patent Application Ser. No. 60/537,117, filed Jan. 16, 2004, the disclosure of which is hereby incorporated herein by reference in its entirety.

REFERENCE TO COMPUTER PROGRAM LISTING APPENDIX ON CD-R

A computer program listing is being submitted herewith as a 10 KB file and a 24 KB file on CD-R (in duplicate). Each CD-R is marked in indelible ink to identify the Inventors, Title, File Names (XDR_Dictionary.txt and XDR_Mapping.txt), Creation Date (Jan. 18, 2005), Computer System (IBM-PC/MS-DOS/MS-Windows), and Ser. No. 11/037,532. The computer program listing submitted on CD-R is hereby incorporated by reference herein in its entirety.

COPYRIGHT NOTICE

The portion of this disclosure appearing on the enclosed CD-Rs is subject to copyright protection. The copyright owner has no objection to the facsimile reproduction by anyone of the patent disclosure as it appears in the Patent and Trademark Office files or records, but otherwise reserves all copyrights whatsoever.

TECHNICAL FIELD

The subject matter described herein relates to methods and systems for processing data. In particular, the subject matter described herein relates to a configurable adapter for processing telecommunications data from multiple sources and in multiple formats.

BACKGROUND ART

Telecommunications networks have become increasing complex with regard to the amount, type, and volume of information they transmit. In an attempt to understand the performance and capacity of the networks, probes are used to collect telecommunications signaling messages and create data records describing various aspects of network performance. In telecommunications signaling networks, probes typically consist of hardware that non-intrusively copies signaling messages from signaling links that interconnect telecommunications network nodes. In other examples, the probes include hardware and/or software internal to telecommunications signaling nodes themselves to copy signaling messages that traverse the nodes. Messages copied by the probes may be forwarded to a central location where data records are produced.

Various applications utilize the data produced by the probes to provide insight into the service delivery, traffic volume, interconnections to other networks, security, as well as other performance metrics. However, each protocol, probe, and data type often produce unique and/or proprietary data formats as output. Further complicating the analysis, applications that use the data produced by the probes may require the data to be provided in specific formats, which are often different from those provided by the probes.

One particular problem associated with providing applications that process signaling message data obtained from network monitoring probes is that a single telecommunications service provider may have an installed base of probes that are manufactured by different probe vendors. Because of the capital investment in the existing probe set, the service provider may be unwilling to replace the heterogeneous probe set with a homogeneous probe set from a single probe vendor. Thus, it is necessary for an application provider to write customized applications for each vendor's probes. Requiring an application provider to write different software for each vendor's probes is cumbersome and results in unnecessary duplication of labor in creating the software.

A second problem associated with providing software that processes data from network monitoring probes occurs when the probe provider upgrades its software or hardware. When this occurs, the format of the data output by the probes may change. As a result, a provider of customized applications must rewrite application software for each new release of probe hardware and/or software. Requiring that the application provider's software release schedule be controlled by the release schedule of the probe provider is undesirable as it may interfere with the application provider's business.

Accordingly, in light of these difficulties associated with providing software that processes data from network monitoring probes, there exists a need for improved methods, systems, and computer program products for providing a configurable telecommunications detail record adapter.

DISCLOSURE OF THE INVENTION

The subject matter described herein is generally directed to a system that can be configured to receive, process, and output data including telecommunications detail records produced from network probes monitoring telecommunications networks. The telecommunications detail records can be received in multiple formats and/or from multiple sources. The term "telecommunications detail record," as used herein, refers to a data record generated as a result of activity on one or more networks. Examples of telecommunications detail records include call detail records, transaction detail records, signal unit detail records, Internet protocol detail records, and session detail records, among others. Thus, a telecommunications detail record may include a copy of a single signaling message, copies of multiple signaling messages, or copies of parameters from a single or multiple signaling messages.

One aspect of the subject matter described herein includes a network-side I/O interface for receiving telecommunications detail records produced by network probes in multiple formats, a mapping module for defining data maps from input formats to output formats, one or more adapters that are configured using the data maps and that use the data maps to process the received telecommunications detail records, a synchronizer for combining multiple data sets of processed telecommunications detail records into one or more output data sets, and an application-side I/O interface for transmitting the output data stream to various destinations.

In one feature of the system, multiple adapters are deployed to process input data streams from multiple sources, each of which may produce data in different formats and thus may require separate data mappings. The different formats may be related to the physical format of the data, (e.g., binary, ASCII, etc.) or the logical format of the data (e.g., storing a date/time in one field versus storing the date in one field and the time in a separate field). The mapping module may be used to define the separate mappings for mapping one or more input fields to one or more output fields and for defining the destination format and location for the output. The mappings can include a straight input to output map, combinations of fields, edited fields, and mathematical and binary operations on the data in one or more fields to produce output data in the desired format(s).

According to another aspect of the subject matter described herein, configurable adapter instances can be created by an end user without requiring that the end user manually rewrite adapter source code. In one method, an end user, such as a technician employed by a telecommunications service provider, creates a configuration file containing input data types, output data types, field mappings, etc., via a menu-driven graphical user interface. As the user fills in fields in the graphical user interface, a configuration file including the data types and the field mappings is created. Next, the configuration file is automatically converted into JAVA™ code using stored JAVA™ libraries. The JAVA™ code is then compiled into executable code for a configurable adapter instance. Because an adapter instance can be automatically created, the time and labor required to adapt to different data input or output formats is reduced.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
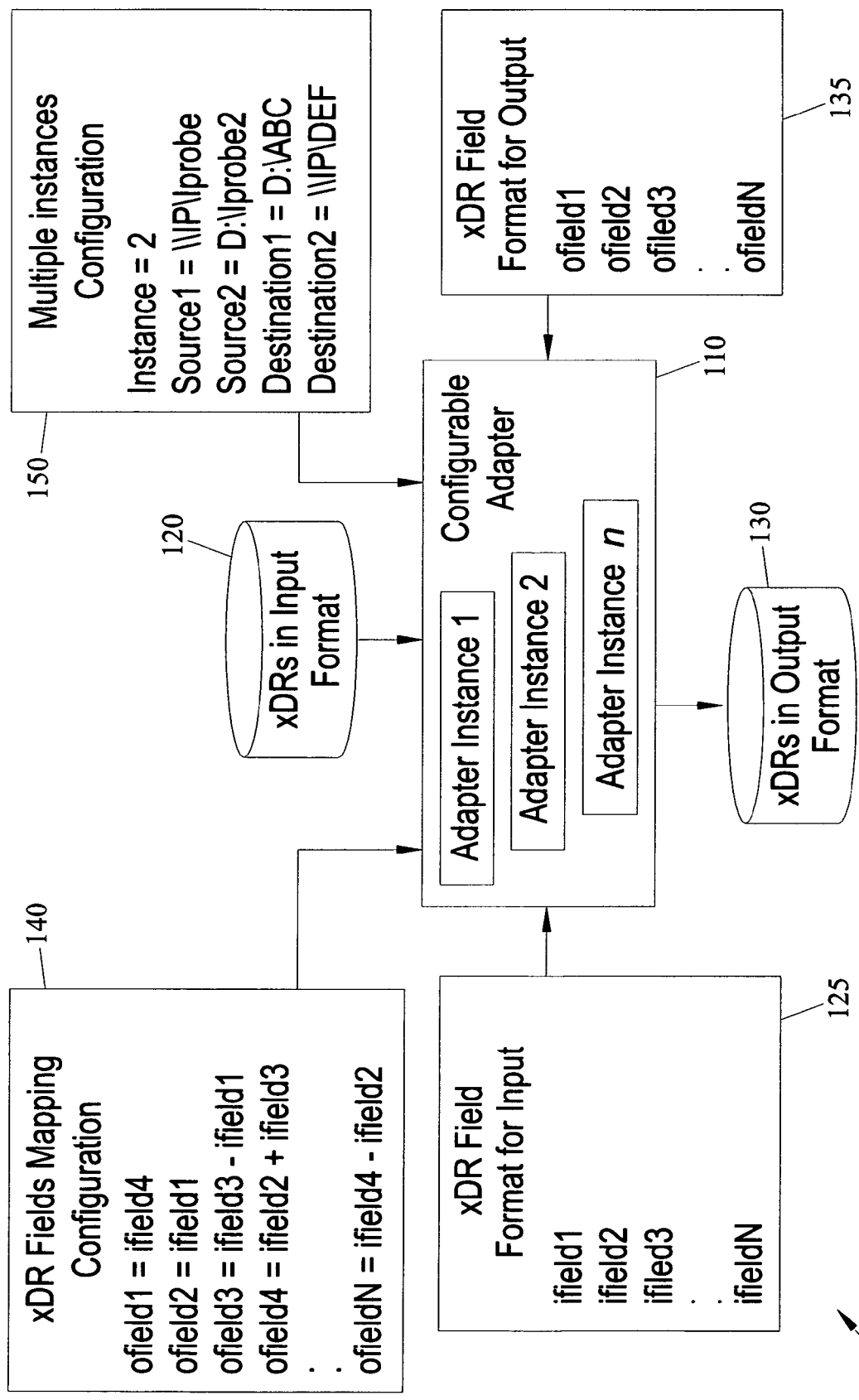
FIG. 1 is a block diagram illustrating exemplary overall components of a system for providing a configurable telecommunications detail record adapter according to an embodiment of the subject matter described herein.

FIG. 1 is a block diagram illustrating an exemplary system 100 for providing a configurable adapter for processing telecommunications detail records and telecommunications signaling messages according to an embodiment of the subject matter described herein. Referring to FIG. 1, system 100 includes a configurable adapter 110 which may in some embodiments include multiple instances of one or more components of adapter 110. Adapter 110 receives telecommunications detail records 120 (abbreviated as xDRs) in a predefined input format 125. As stated above, the telecommunications detail records may include signaling message copies, such as SS7 or IP telephony signaling message copies, or parameters extracted from single or groups of signaling messages. Using an input field mapping configuration 140 and instance configuration 150, configurable adapter 110 processes input data 120 to conform to an output format 135 and produces telecommunications detail records 130 in specified output format 135.

Field mapping configuration 140 facilitates the mapping of input fields to output fields using mappings, such as one-to-one, one-to-many, many-to-one, many-to-many, as well as mathematical and logical functions. For example, a one-to-one field mapping may define an output field as the complete data residing in one input field. A one-to-many mapping may be used to map the complete data in one input field, or certain portions of the data, to numerous output fields. For example, if the input field includes a date and time (01132004:17:50:24.30), downstream applications may require the data be split into two separate fields, such as a date field (01132004) and a time field (17:50:24.30).

In addition to mapping data from field(s) to field(s), mathematical, lexical, or logical functions may be performed on one or more input fields to produce the desired output. For example, the desired output may be a field representing the talk time of a call, whereas the input data may store only the call start and call end times. Using a mapping such as Output(talktime)=Input(callend)−Input(callstart), the adapter can produce the desired output. Other mathematical or logical functions include addition, multiplication, division, unary subtraction, percentage calculations, exponential calculations, logical and, logical or, logical binary (yes or no), bitwise and bitwise or. Lexical operations include operations that divide strings into components based on criteria or keys and reformat and/or recombine the components into new strings. Examples of lexical operations include concatenation of a text string, parsing of a text string, removal of special characters, and others.

Furthermore, instance configuration 150 defines which input sources are used to create the defined outputs, the instance of adapter 110 that is used to process a particular set of inputs, and the physical sources and destinations of the input and output data.

Figure 2:
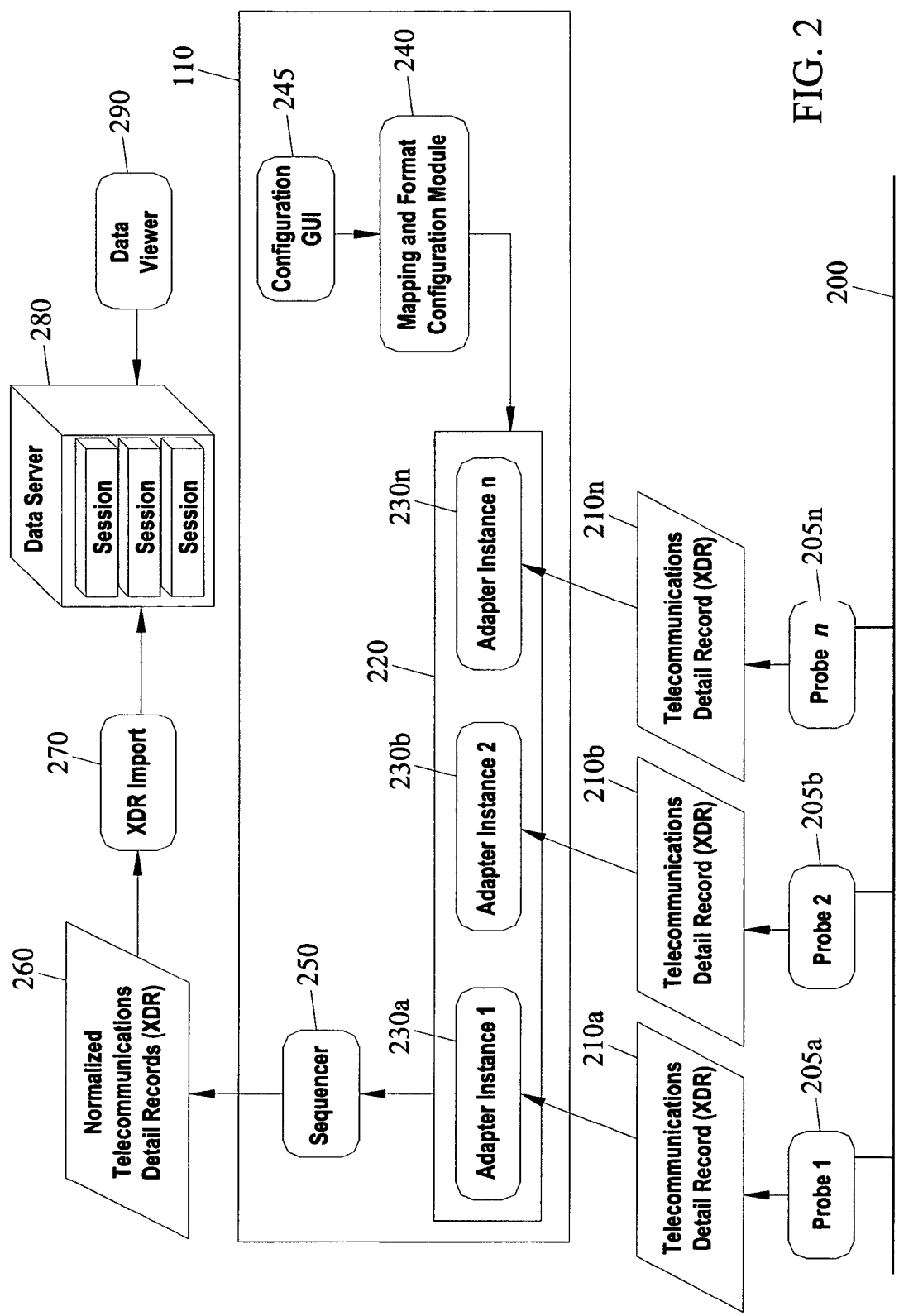
FIG. 2 is a block diagram illustrating exemplary deployment of a configurable adapter in a telecommunications network environment according to an embodiment of the subject matter described herein.

FIG. 2 illustrates an exemplary deployment of configurable adapter 110 in a telecommunications network environment. Referring to FIG. 2, in one embodiment, the system is deployed in a telecommunications network 200. Network 200 can be of any type of telecommunications network and can carry information in one or more protocols such as ISUP, IS-41, GSM, TCAP, MAP, SMS, MMS, GPRS, UMTS, AIN, INAP, CDMA, CDMA2000, SIGTRAN, MGCP, MEGACO, BICC, H.323, H.248, SIP, SIP-T, ISDN, as well as others. Network 200 can be a series of smaller networks, or part of a larger network. A series of probes 205a, 205b and 205n, (generally 205) communicate with the network 200 to monitor network performance, among other activities. Any one or more of various types of network probes can be used, and the make, model, or functionality of the probes 205 is not relevant to the invention. Each probe 205 produces data representative of the network's status, performance, capacity, etc. in the form of telecommunications detail records, 210a, 210b, and 210n, (generally, 210). Probes 205a-205n may be manufactured by the same probe vendor or by different probe vendors. In addition, it is understood that probes 205a-205n are not limited to the hardware components that copy signaling messages from signaling links. For example, probes 205a-205n may represent network monitoring systems that include link probes and downstream components, such as data collection servers, that store copied signaling messages or message parameters. Accordingly, configurable adapter 110 may interface with downstream components, such as data storage servers, or any other component of a network monitoring system.

An exemplary network monitoring system with which configurable adapter 110 may interface is described in commonly-assigned, co-pending U.S. patent publication no. 20040114741, the disclosure of which is incorporated herein by reference in its entirety. Briefly, this system includes link probes that copy signaling messages directly from signaling links and message copy functions internal to signaling nodes, such as signal transfer points, that copy messages routed by those nodes. The system also includes an administration server that allows a user to define message copying rule sets. The link probes forward message copies to network monitoring platforms. The network monitoring platforms forward message copies to site collectors that collect messages from individual network monitoring sites. The site collectors forward message copies to a data gateway server where application-specific CDRs are produced. Configurable adapter 110 may interface with any of the components in the above-described network monitoring system to obtain network monitoring data. In one exemplary implementation, configurable adapter 110 may receive raw CDRs from the data gateway server and may process the raw CDRs into application-specific CDRs. The configurable adapter may also include an MSU feed for receiving MSUs from the site collectors.

Configurable adapter 110 may operate as a software component residing on a computer. Alternatively, configurable adapter 110 may operate as a reconfigurable hardware or firmware component. Configurable adapter 110 may be in direct communication with probes 205, or, in some embodiments, with a data storage device used to store data produced by the probes 205. Configurable adapter 110 may include of a mapping and format configuration module 240, an adapter engine 220, and a sequencer 250. In some embodiments, multiple instances of the adapter engine 220 (also referred to herein as adapter instances) can be operating in parallel, as shown at 230a, 230b, and 230n (generally 230). Each instantiation of the adapter engine 220 may operate on separate computer hardware elements, or in some embodiments on the same hardware elements.

Mapping and format configuration module 240 facilities the definition of field mapping configuration 140 and instance configuration 150. In some embodiments, a configuration graphical user interface 245 is provided to allow users to define, describe, and modify the field mapping configuration 140 and the instance configuration 150.

Each instantiation 230 of adapter engine 220 requests, or in some embodiments receives, telecommunications detail records or messages 210 from one or more network probes 205. The data may be stored in ASCII format on a file server residing on or off of the network 200, or in other embodiments some of the telecommunications detail records 210 may be stored in a database. Each instance 230 of adapter engine 220 uses a corresponding instance configuration 150 to determine the source, frequency, and format of records 210 to be processed by that instance 230 of the adapter engine 220. Once adapter engine 220 receives records 210, adapter engine 220 processes records 210 according to field mapping configuration 140, and produces a set of output telecommunications detail records according to the format(s) described in field mapping configuration 140.

In cases where multiple outputs are produced, each instance 220 of adapter engine 230 sends the output telecommunications detail records to a sequencer 250. Sequencer 250 then combines the output telecommunications detail records into normalized telecommunications detail records 260. Normalized telecommunications detail records 260 may include a stream or grouping of telecommunications detail records arranged in a time order. In some embodiments, sequencer 250 uses business rules governing the type of data being processed, the application(s) receiving the output, or other rules defined in mapping and configuration module 240. For example, each instance 230 of adapter engine 220 may receive data from separate probes 205; however, the business application used to analyze the data may require the data to be sequenced chronologically and not separated by the source of the data. In such a case, sequencer 250 assembles the resulting output from each instance of adapter engine 220 into the normalized telecommunications detail records 260 by sorting the records by transaction time. An exemplary method for sorting telecommunications detail records by transaction time will be described in detail below.

Normalized telecommunications detail records 260 can then be imported into a data server 280, or other data storage device using an import module 270. The type of data storage device may depend on the applications being used to analyze the data, and in some cases may be third-party databases, such as Oracle, SQLServer, or others. In other embodiments, the data may be stored as a collection of one or more flat files. In some embodiments, a data viewer 290 may be provided to allow users to query, view, or report on the data residing in the data server 280.

Figure 3:
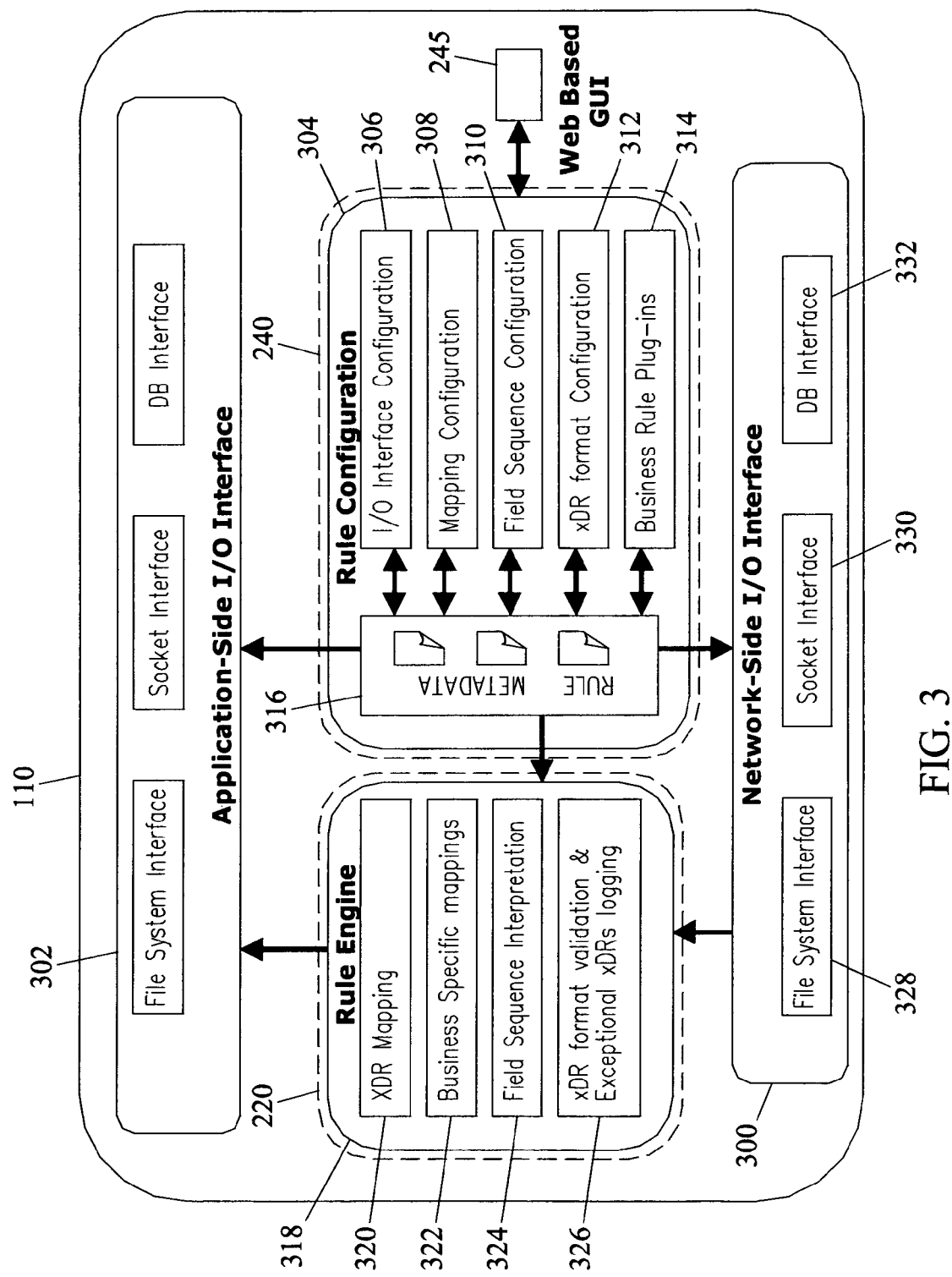
FIG. 3 is a block diagram illustrating an exemplary architecture for a configurable adapter according to an embodiment of the subject matter described herein.

FIG. 3 is a block diagram illustrating an exemplary internal architecture for configurable adapter 110 in more detail. Referring to FIG. 3, configurable adapter 110 includes components 220, 240, and 245 described above with regard to FIG. 2. In addition, configurable adapter 110 includes a network-side I/O interface 300 and an application-side I/O interface 302. Further, mapping and format configuration module 240 includes a rules configuration module 304, which includes I/O interface configuration module 306, mapping configuration module 308, field sequence configuration module 310, xDR format configuration module 312, business rules plug-ins 314, and rule metadata 316. The overall function of rules configuration module 304 is to create a configuration file that is used to create adapter instances 230 illustrated in FIG. 2. The configuration file may be a text formatted file, such as an XML-formatted file that is converted into source code and eventually into executable code. In FIG. 3, the configuration file is represented by rule metadata 316. I/O configuration module 306 creates the portion of the configuration file that is used to communicate with I/O interfaces 300 and 302 based on I/O configuration data received from the user.

Exemplary I/O interface configuration data received from the user includes file formats, number of telecommunications detail records that will be created, and source and destination file system information, and log file generation information.

Mapping configuration module 308 receives user-specified field mappings and operations from GUI 245 and generates the corresponding portion of the configuration file. Examples of user specified field mappings and operations are shown in xDR field mapping configuration block 140 illustrated in FIG. 1. These mappings may include mappings from input data fields to output data fields. Different input data formats may be handled by allowing a user to define an input xDR dictionary. An input xDR dictionary may allow a user to specify fields, data types, field lengths, and field descriptions for different input xDR formats. For example, a user may define different input xDR dictionaries for processing xDRs from different probe vendors. Such dictionaries may be created using mapping configuration module 308. Field sequence configuration module 310 defines the portion of the configuration file that controls how output xDRs will be sequenced. For example, a user may input data with regard to a wait time to make sure that all xDRs have been received before ordering the xDRs. An exemplary method for field sequence configuration that may be created using field sequence configuration module 310 will be described in detail below.

xDR format configuration module 312 stores the output xDR format specified by the user via web based GUI 245. Similar to the input xDR dictionaries described above, xDR format configuration module 312 may allow the user to define output xDR fields, data types, field lengths, and field descriptions. Mapping configuration module 308 allows the user to define mappings between input and output xDR dictionaries.

Business rules plug-ins 314 include any business specific rules with regard to xDR formats that are specified by an external application. Examples of business rules include specific mapping rules that apply to a company's input or output xDR format. For example, a probe provider may produce xDRs in one format, and an application provider may wish to deviate from that format. Accordingly, the application provider may define a business-specific mapping rule that maps the probe provider's xDRs to the application provider's format.

The text data input by the user via web-based GUI 245 is converted by each module 306-314 into rule metadata 316. As stated above, rule metadata 316 may be an XML-formatted configuration file. Once the configuration file is complete, the configuration file is provided to rules engine 318, which includes source code classes, such as JAVA™ classes, used to convert the configuration file into a source code file and then into an executable file. Rules engine 318 may include or have access to a compiler for compiling the adapter instance source code into an executable adapter instance. In the illustrated example, rules engine 318 includes an xDR mapping module 320, a business specific mapping module 322, a field sequence interpretation module 324, and an xDR format validation and exception xDR logging module 326.

xDR mapping module 320 includes source code libraries that map user implement the user-specified input formats, output formats, and mappings. Business specific mappings module 322 includes libraries that implement the business specific mappings specified by the user. Field sequence interpretation module 324 includes libraries that implement the sequencing of xDRs, as described above. xDR format validation and exceptional logging module 326 implements user specified rules for logging events. For example, if an input xDR does not match any of the specified input data formats, rather than discarding the xDR, the xDR may be logged as an exception.

I/O interfaces 300 and 302 each include a file system interface 328, a socket interface 332, and a database interface 324. File system interface 328 of each module interfaces directly with the file system of a network-side system. For example, if the network- or application-side system is a Unix-based system, file system interface 328 may be a Unix-based file system interface. Socket interface 330 interfaces directly with network sockets to receive xDRs in real time. Examples of socket interfaces suitable for use with embodiments of the subject matter described herein include WindowS™ sockets interfaces and BSD sockets interfaces. Database interfaces 332 interface directly with database subsystems on input and output systems. Database interfaces 332 may be any suitable database interfaces, such as ODBC-compliant database interfaces.

Figure 4:
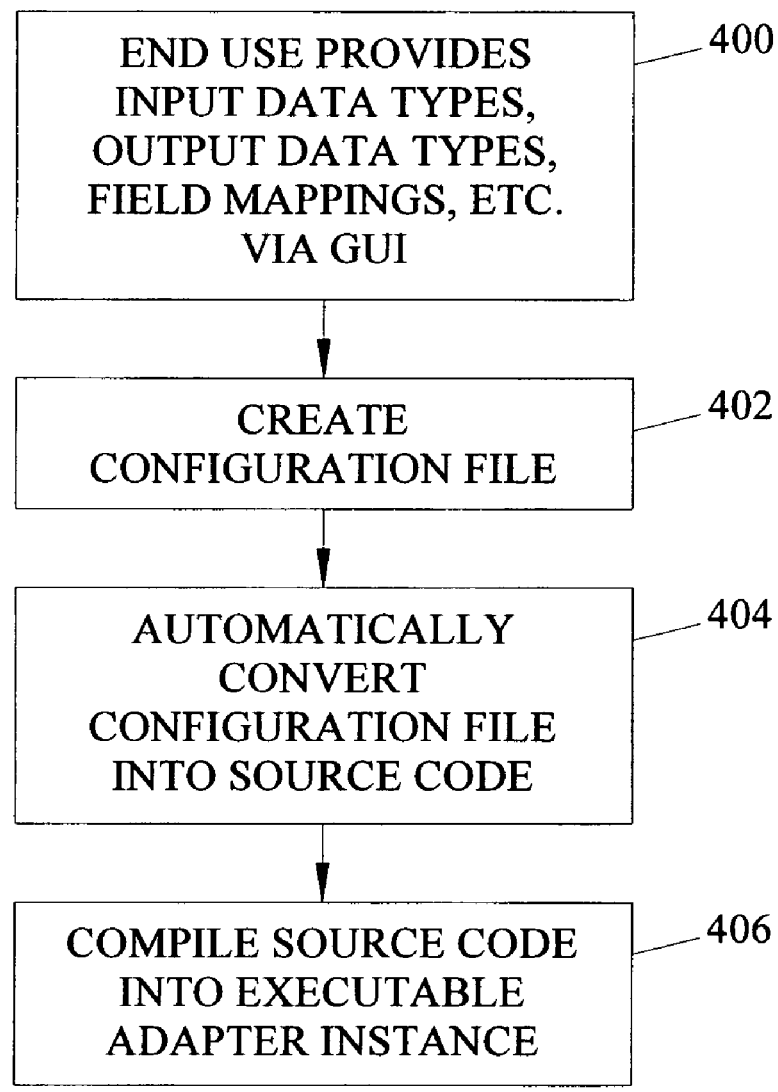
FIG. 4 is a flow chart illustrating exemplary steps for creating a new adapter instance according to an embodiment of the subject matter described herein.

FIG. 4 is a flow chart illustrating exemplary steps for creating an adapter instance according to an embodiment of the subject matter described herein. Referring to FIG. 4, in step 400, a user creates a configuration file containing input data types, output data types, field mappings, etc., via graphical user interface 245 illustrated in FIGS. 2 and 3. In step 402, modules 306-314 illustrated in FIG. 3 create a configuration file corresponding to the user input. In step 404, modules 318-326 automatically convert the configuration file into source code. In step 406, the source code is compiled into an executable adapter instance.

The following example illustrates an XML-formatted XDR dictionary that may be generated and stored in configuration file 316 based on user input received via user interface 245.

```
<?xml version="1.0"?>
<!DOCTYPE configurableadapterschemadef [
    <!ELEMENT    cacdrschemadef (Fields)>
    <!ELEMENT    fielddefs   (field+)>
    <!ATTLIST fielddefs  type (binary|ascii)   #REQUIRED>
    <!ATTLIST schemaformat  type CDATA   #REQUIRED>
    <!ATTLIST field  name   CDATA   #REQUIRED>
    <!ATTLIST field  type
    (NUMBER|TEXT|BCD|POINTCODED) #REQUIRED>
    <!ATTLIST field  index  CDATA   #REQUIRED>
    <!ATTLIST field  size   CDATA   #REQUIRED>
]>
<cacdrschemadef>
<!-- Generator's XML file-->
    <schemaformat type="Tekelec10"/>
    <fielddefs type='ascii' >
        <field name="SequenceId" type="TEXT" index="0" size="10"/>
        <field name="SIO" type="NUMBER" index="1" size="1"/>
        <field name="OPC" type="POINTCODED" index="2" size="11"/>
        <field name="DPC" type="POINTCODED" index="3" size="11"/>
        <field name="CIC" type="NUMBER" index="4" size="5"/>
        <field name="IAMTime" type="NUMBER" index="5" size="13"/>
        <field name="ACMTime" type="NUMBER" index="6" size="13"/>
        <field name="ANMTime" type="NUMBER" index="7" size="13"/>
        <field name="SUStime" type="NUMBER" index="8" size="13"/>
```

-continued

```
            <field name="RESTime" type="NUMBER" index="9"
    size="13"/>
            <field name="RESIndicator" type="NUMBER"
    index="99" size="1"/>
        </fielddefs>
    </cacdrschemadef>
```

As illustrated in the xDR dictionary example above, message field names, such as OPC and DPC, are specified along with their types, sizes, and indexed location in the dictionary. This data is used to extract corresponding source code for generating xDRs having the indicated format from stored source code libraries. In the Computer Program Source Code Appendix, the file XDR_Dictionary.txt contains automatically generated source code corresponding to the xDR dictionary listed above. The source code is written in the JAVA™ programming language. However, the methods and systems described herein are not limited to automatically converting the configuration file to the JAVA™ programming language. Automatically generating any suitable source or object code language is intended to be within the scope of the subject matter described herein. Examples of other suitable languages that may be generated include C, C++, and assembly language.

The following example illustrates an XML-formatted mappings between input and output XDR formats that may be generated and stored in configuration file 316 based on user input received via user interface 245.

```
<?xml version="1.0"?>
<!DOCTYPE configurableadaptermappingdef [
    <!ELEMENT    camappingdef    (ioformats, mappings)>
    <!ELEMENTmappingdefs    (mapping+)>
    <!ATTLIST ioformats inputtype    CDATA    #REQUIRED>
    <!ATTLIST ioformats outputtype    CDATA    #REQUIRED>
    <!ATTLIST customclass name    CDATA    #REQUIRED>
    <!ATTLIST customclass instance    CDATA    #REQUIRED>
    <!ATTLIST mapping    target    CDATA
    #REQUIRED>
    <!ATTLIST mapping    expression CDATA    #REQUIRED>
]>
<cacdrmappingdef>
<!-- Generator's XML file-->
    <ioformats inputtype="Tekelec10"
outputtype="SteleusTelephony" />
    <customclassdefs>
        <customclass name="TranslateOPDCTekelecNew"
instance="topdc1" >
            <parameter index='0'>DPC</parameter>
        </customclass>
        <customclass name="TranslateOPDCTekelecNew"
instance="topdc2" >
            <parameter index='0'>OPC</parameter>
        </customclass>
        <customclass name="CauseFamilyTekelec"
instance="cf1" >
            <parameter
index='0'>CauseIndClassVal</parameter>
            <parameter
index='1'>CauseIndGenLoc</parameter>
            <parameter index='2'>IAMTime</parameter>
            <parameter index='3'>ACMTime</parameter>
            <parameter index='4'>RELTime</parameter>
            <parameter index='5'>RLCTime</parameter>
            <parameter
index='6'>RELDirection</parameter>
        </customclass>
        <customclass name="Location" instance="lc1" >
            <parameter
index='0'>CauseIndGenLoc</parameter>
        </customclass>
        <customclass name="StoreNature" instance="snoa2"
>
            <parameter
index='0'>CgPNNatAdd</parameter>
        </customclass>
    </customclassdefs>
    <mappingdefs>
        <!--reject expression="IF ( [CIC] == {0} ) ^CIC^"/--
>
        <mapping target="Link"
expression="{T}ALL_LINK{T}"/>
        <mapping target="TimeTag" expression="( [RLCTime]
            > {0} AND [RLCTime]
                                        > [RELTime] ) ?
                        [RLCTime] / {1000} : (
                        [RELTime] > {0} AND
                        [RELTime] > [ANMTime]
                        ) ? [RELTime] / {1000} :
                        ( [ANMTime] > {0} AND
                        [ANMTime] > [ACMTime]
                        ) ? [ANMTime] / {1000}
                        : ( [ACMTime] > {0}
                        AND [ACMTime] >
                        [IAMTime] ) ? [ACMTime]
                        / {1000} : [IAMTime] >
                        {0} ? [IAMTime] /
                        {1000} : {0}"/>
        <mapping target="StartDate" expression="[IAMTime]
/ {1000}"/>
        <mapping target="DPC" expression="CALL
#topdc1#"/>
        <mapping target="OPC" expression="CALL
#topdc2#"/>
        <mapping target="CIC" expression="[CIC]"/>
        <mapping target="Protocol" expression="( [SIO] =
{2} ) ? {7} : {67}"/>
        <mapping target="CauseValue"
expression="[CauseIndClassVal]"/>
        <mapping target="LocationValue" expression="CALL
#lc1#"/>
        <mapping target="CDRStatus" expression ="CALL
#cst1#"/>
        <mapping target="ReleaseOrigin" expression="CALL
#rorg1#"/>
        <mapping target="CauseFamily" expression="CALL
#cf1#"/>
        <mapping target="Charge" expression="( [BCIBAbits]
    < {0} ) ? {255} :
                                        [BCIBAbits]"/
                                        >
        <mapping target="Direction" expression="CALL
#d1#"/>
        <mapping target="BNumberNature" expression="CALL
#snoa1#"/>
        <mapping target="ANumberNature" expression="CALL
#snoa2#"/>
        <mapping target="CNumberNature" expression="CALL
#tcnn1#"/>
        <mapping target="ANumber" expression="CALL
#sn1#"/>
        <mapping target="BNumber" expression="CALL
#sn2#"/>
        <mapping target="Tns" expression="CALL #sn3#"/>
        <mapping target="CNumber" expression="CALL
#tcn1#"/>
        <mapping target="CNumberType" expression="CALL
#cnumt1#"/>
        <mapping target="ChargeNumberNature"
expression="[ChargeNatAdd]"/>
        <mapping target="ChargeNumber" expression="CALL
#sn7#"/>
        <mapping target="Juridiction" expression="CALL
#sn6#"/>
        <mapping target="Gap" expression="CALL #sn5#"/>
        <mapping target="GapNature" expression="CALL
#snoa4#"/>
        <mapping target="GapType"
expression="[GAPNatAdd]"/>
```

-continued

```
        <mapping target="Carrier" expression="CALL #sn8#"/>
        <mapping target="InterWorking" expression="[FCIDbit]"/>
        <mapping target="OutTrunkNum" expression="CALL #sn4#"/>
        <mapping target="ANumberCategory" expression="[CgPNCat]"/>
        <mapping target="Q708activated" expression=" {255} "/>
        <mapping target="RedirectionInfo" expression=" {255} "/>
        <mapping target="UserTeleService" expression=" {255} "/>
        <mapping target="LinkType" expression=" {255} "/>
        <mapping target="HopCounter" expression="[HopCounter]"/>
        <mapping target="CarrierSelection" expression="[CarrierSelection]"/>
        <mapping target="OLI" expression="[OrigLineInfo]"/>
    </mappingdefs>
</cacdrmappingdef>
```

As illustrated in the xDR mapping example above, target message fields in the output xDR are filled with values from input xDRs and by values that result from expressions generated based on fields in input xDRs. The XML data is used to extract corresponding source code for implementing the indicated mappings stored source code libraries. In the source code appendix, the file XDR_Mapping.txt contains automatically generated source code corresponding to the XDR mapping example listed above. The source code is written in the JAVA™ programming language. However, the methods and systems described herein are not limited to automatically converting the configuration file to the JAVA™ programming language. Automatically generating any suitable source or object code language is intended to be within the scope of the subject matter described herein. Examples of other suitable languages that may be generated include C, C++, and assembly language.

Once the source code files have been generated, the user selects a compile option via graphical user interface 245, and an executable adapter instance is generated. In one exemplary implementation, the source code files may be in JAVA™ format, and the source code files may be compiled using a standard JAVA™ compiler, such as JavaCC™.

As stated above, one feature of the subject matter described herein is a graphical user interface that allows the user to define run-time configuration and xDR creation information that is used to produce each adapter instance. Graphical user interface 245 includes two principal modes of operation—a configuration mode and a configurable adapter definition mode. In configuration mode, graphical user interface 245 allows a user to specify run-time aspects of interfacing with the input and output systems, such as file formats, number of CDRs produced, and source and destination file system location information. In mapping configuration mode, the user specifies input and output data formats and rules for mapping fields between input and output data formats.

Figure 5:
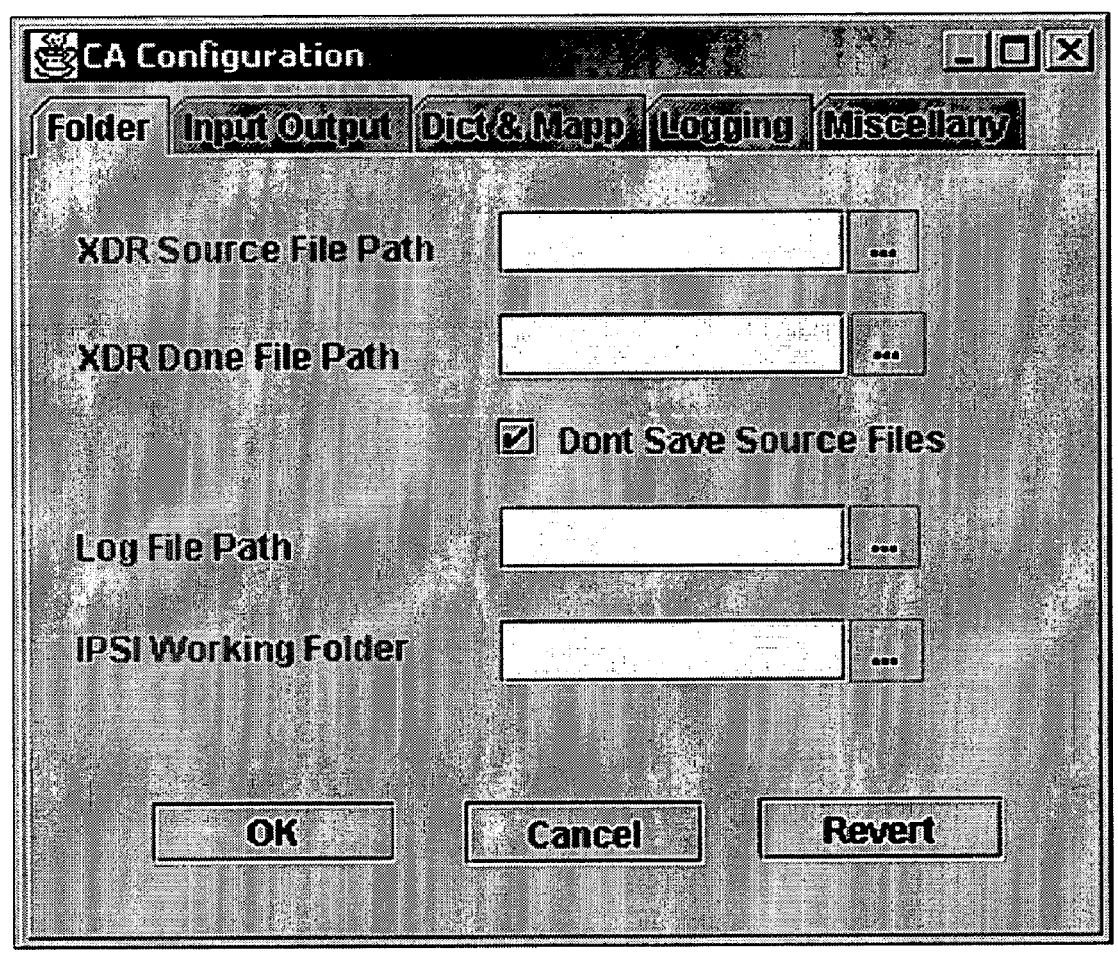
FIGS. 5-9 are exemplary computer screen shots illustrating a graphical user interface for configurable adapter runtime configuration according to an embodiment of the subject matter described herein.

FIGS. 5-9 illustrate exemplary screens that may be presented to the user by graphical user interface 245 in configuration mode. Referring to FIG. 5, one exemplary computer screen may include an input/output folder tab that allows a user to specify an input file system path from which xDRs will be extracted, an output file system path where processed xDRs will be stored. In addition, the input/output screen tells a user to specify a log file path where exceptions will be logged and an IPSI working folder. The IPSI working folder is a temporary folder that the adapter instance uses for disk space.

Figure 6:
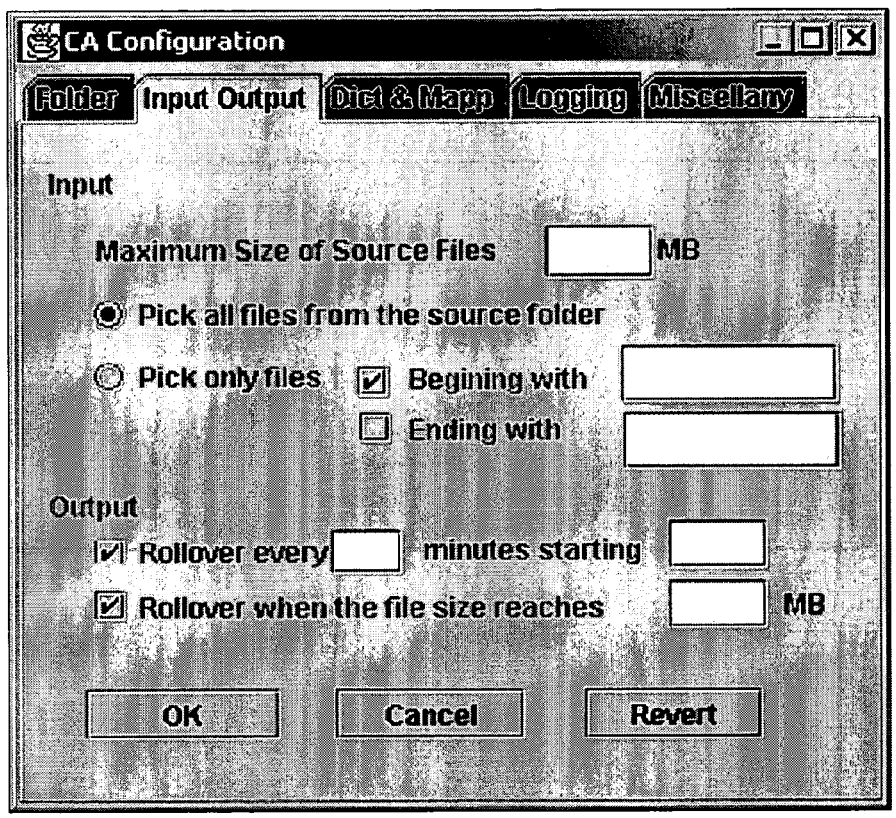

FIG. 6 illustrates an exemplary input/output tab provided by graphical user interface 245. In FIG. 6, the input/output tab allows the user to specify the maximum file size of source files, file names that will be accepted, and output file sizes and rollover parameters. The rollover parameters control how large an output xDR file will be before the file is closed and a new output file is created. The reason for limiting output file size is to ensure that manageable file sizes are created. Such control can be important in network environments where hundreds or thousands of xDRs are created per minute.

Figure 7:
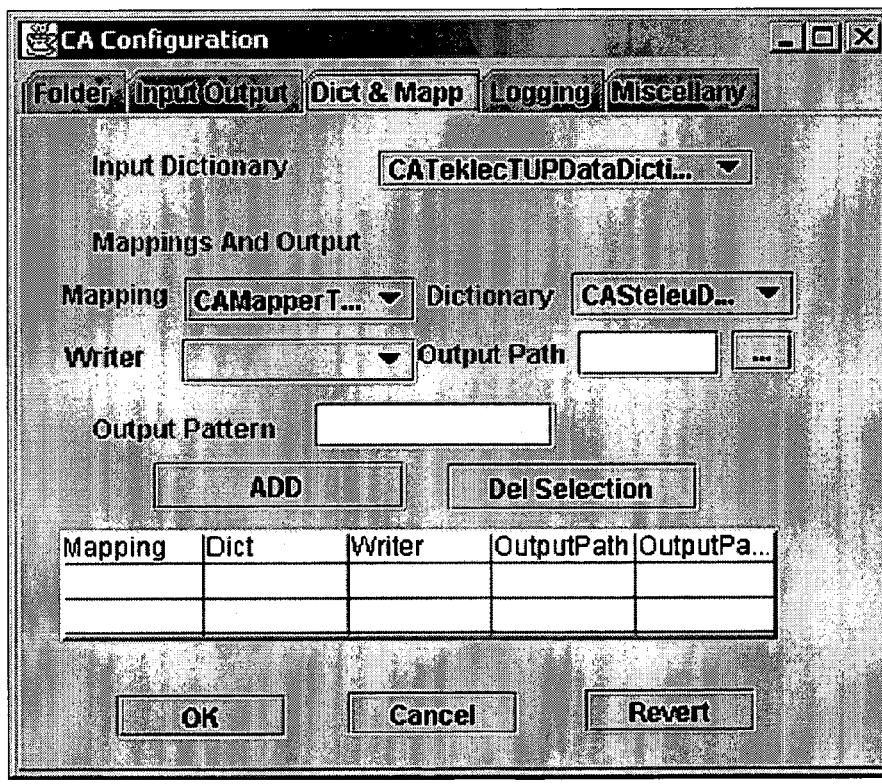

FIG. 7 illustrates an exemplary dictionary and mapping folder tab that may be presented by graphical user interface 245. The dictionary and mapping tab allows the user to specify input dictionaries that define input file formats, output dictionaries that define output file formats, and mappings between the input and output file formats. The output pattern and path fields allow the user to define output file name patterns (e.g., xDR(num).txt, where (num) is incremented for each new file created) and paths where the files will be stored. The table at the bottom of FIG. 7 stores user-selected input formats, output formats, and dictionaries.

Figure 8A:
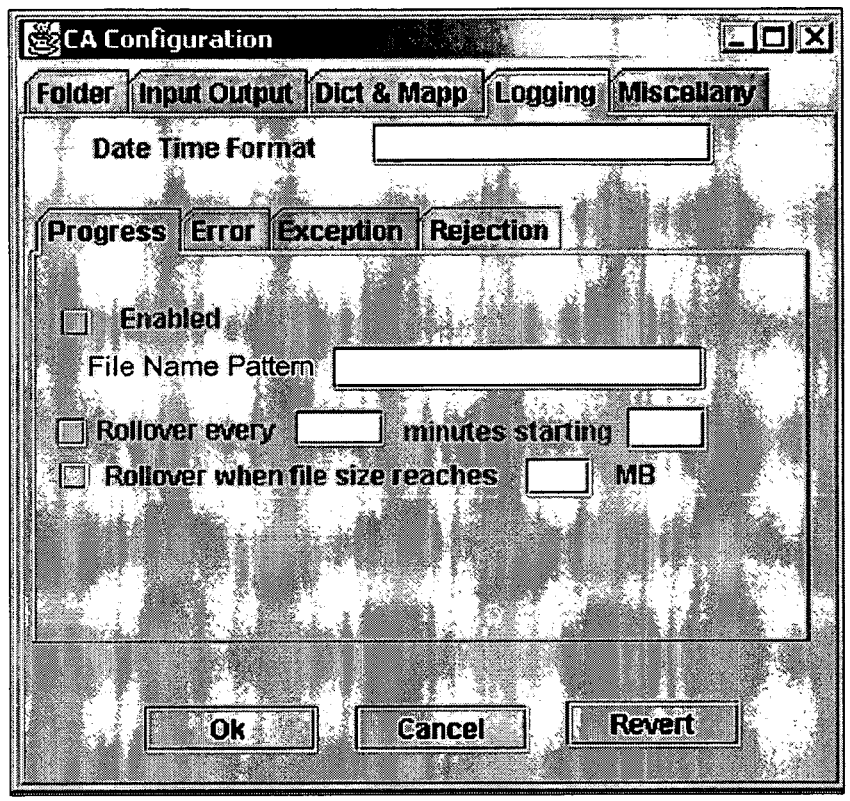

FIG. 8A illustrates an exemplary progress folder tab of a logging folder tab that may be presented by graphical user interface 245. The progress folder tab allows the user to enable or disable logging, and specify log file size and rollover parameters for progress messages generated by the adapter instance during operation. Progress messages may include text-based I/O, such as the number of xDRs created in a given time period. These messages may be important in applications such as billing where it is important to verify that all xDRs are captured. The rollover parameters allow a user to select either a time or a file size that triggers closing of one output file and opening of a new output file. Such parameters may be important to ensure that a manageable output file size is maintained.

Figure 8B:
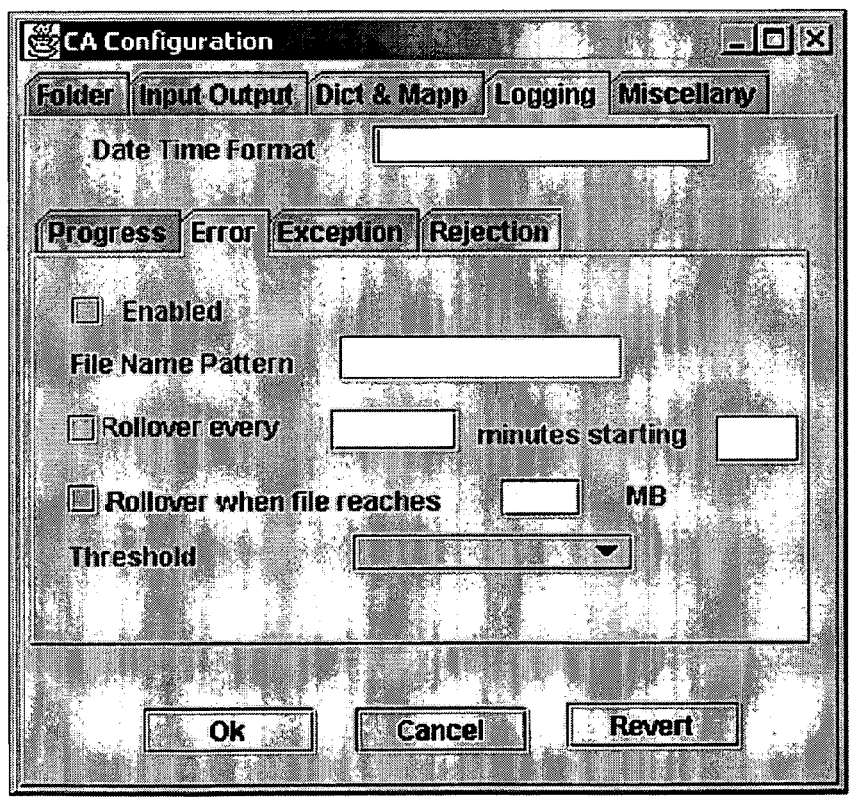

FIG. 8B illustrates an exemplary error folder tab of the logging folder tab. The error folder tab allows the user to specify an error log file name, pattern, size, and rollover time. The error log file stores xDRs that do not match user-specified validation rules. The file name, patter, and rollover parameters are the same as those described with respect to FIG. 8A. Hence, a description thereof will not be repeated herein.

Figure 8C:
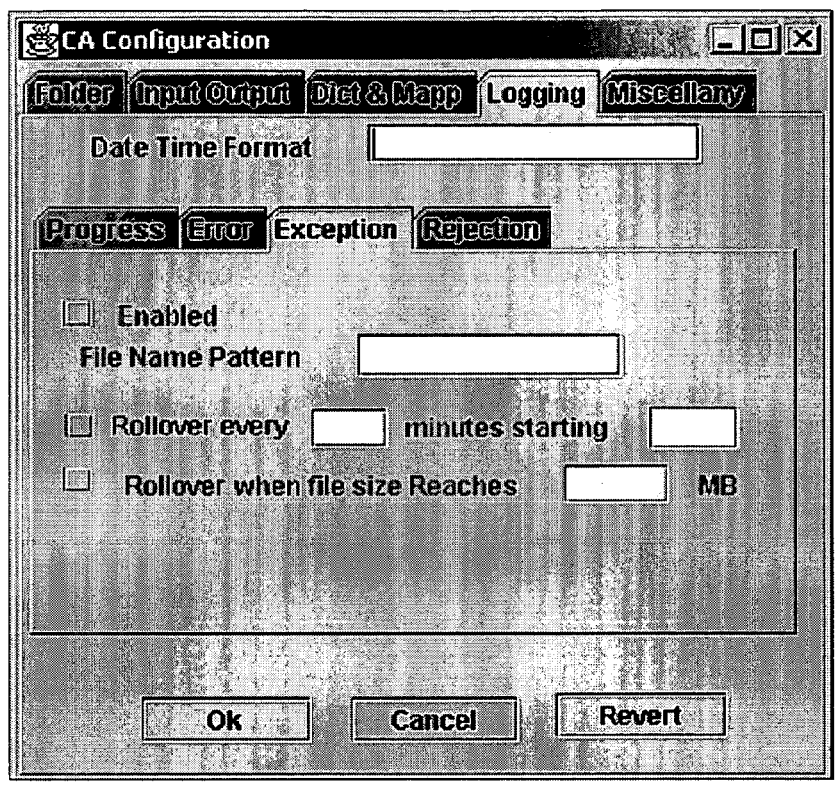

FIG. 8C illustrates an exemplary exception folder tab of the logging folder tab. The exception folder tab allows the user to create an exception log file for logging xDR exceptions. The parameters that may be specified the user include file name, rollover time, and file size. These functions are the same as those described above with regard to FIG. 8A.

Figure 8D:
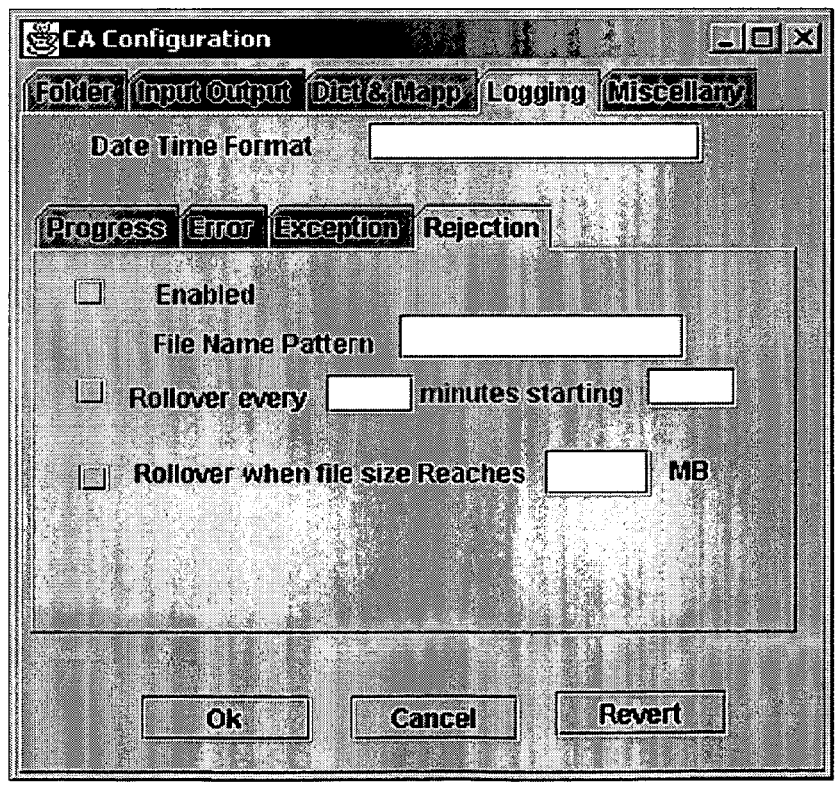

FIG. 8D illustrates an exemplary rejection folder tab of the logging folder tab. The rejection folder tab allows the user to create a log file to store rejected xDRs. Rejected xDRs are those whose content cannot be validated. The rejection folder tab allows the user to specify a rejection log file name, rollover duration, and file size as described above with respect to FIG. 8A.

Figure 9:
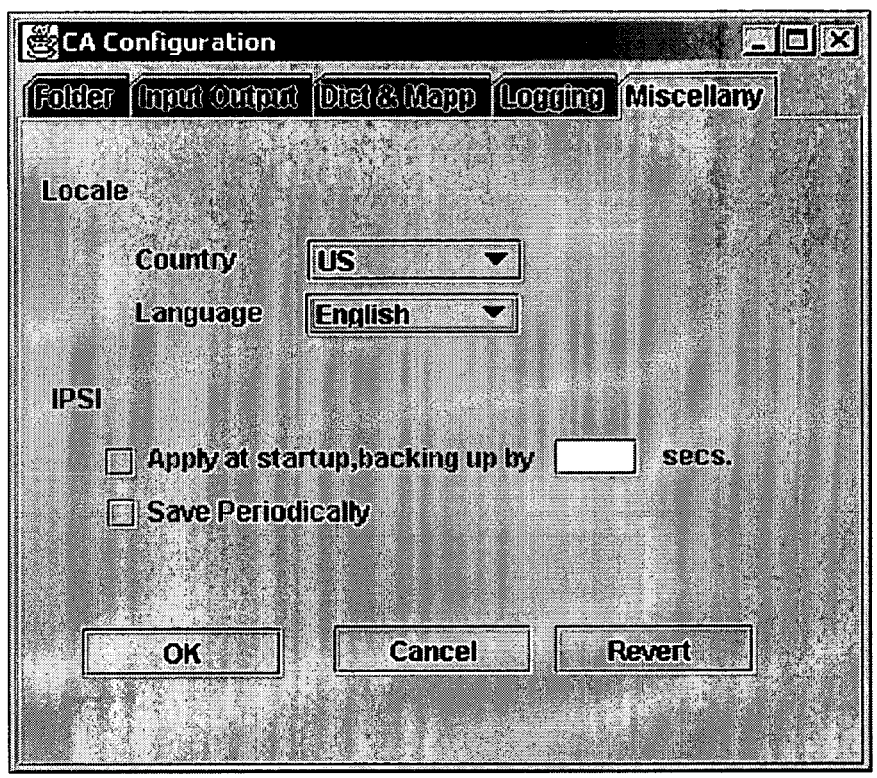

FIG. 9 illustrates an exemplary miscellaneous folder tab that may be provided by graphical user interface 245. In FIG. 9, the folder tab allows the user to specify country and language of the user. The data in FIG. 9 may be used to select the language of comments in the xDR-generated output.

Figure 10:
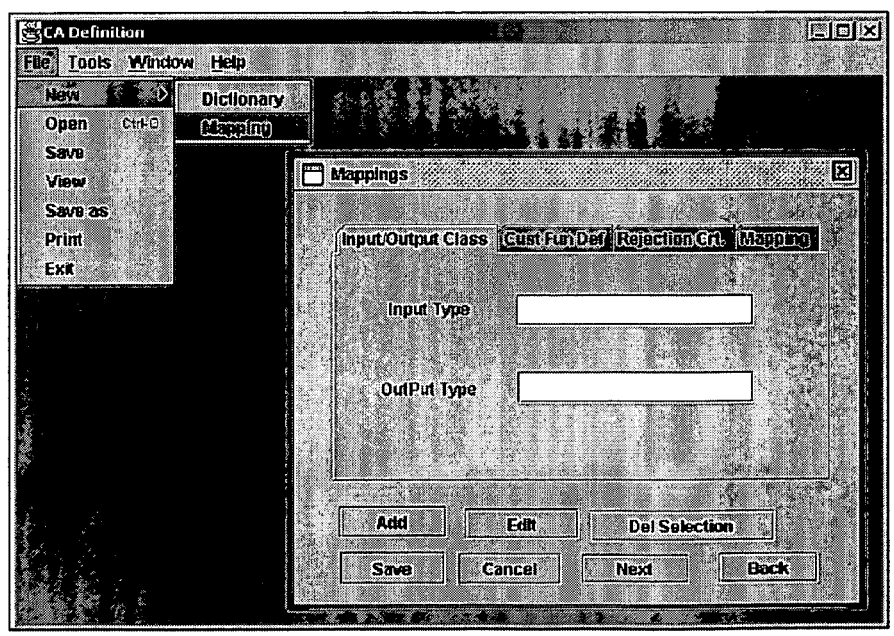
FIGS. 10-17 are exemplary computer screen shots illustrating exemplary screens for defining a configurable adapter instance according to an embodiment of the subject matter described herein.

FIGS. 10-18 illustrate exemplary xDR definition screens that may be presented to the user in defining input and output xDR formats and mappings. FIG. 10 illustrates an input/output class tab that allows the user to specify input and output data types to be used in a mapping conversion. For example, the user may select an input xDR dictionary for the input data type and an output xDR dictionary for the output data type. The dictionary tab on the drop down menu allows the user to define a new input or output data class.

Figure 11:
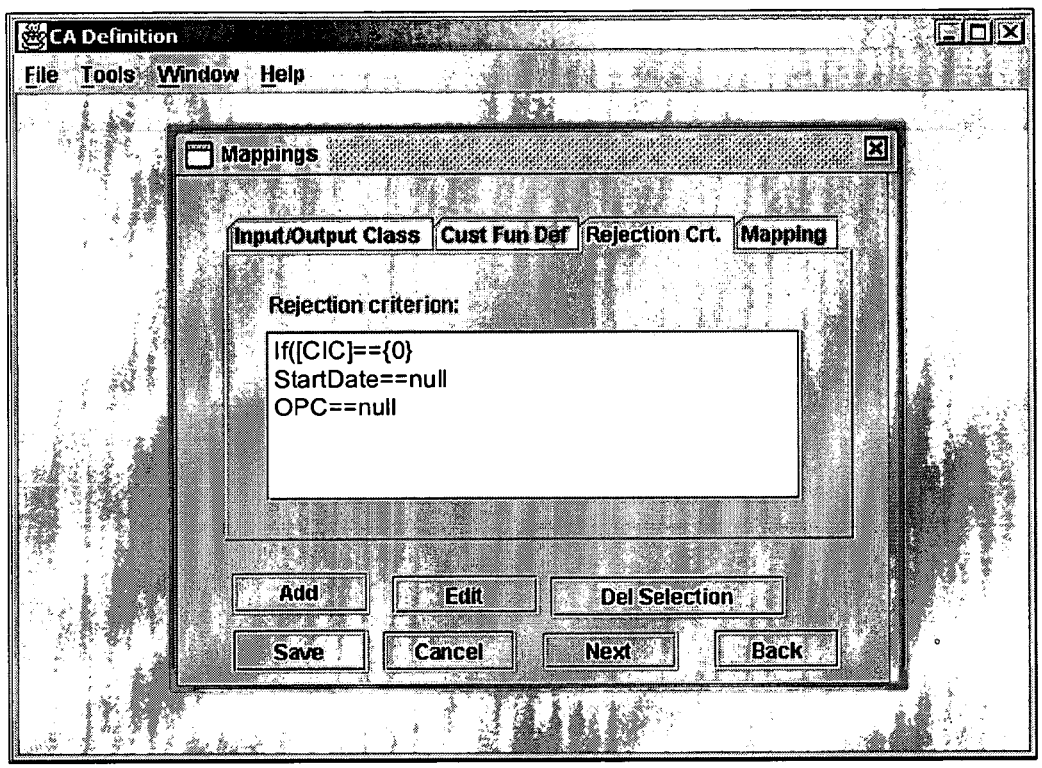

FIG. 11 is an example of a rejection criteria folder tab that may be presented by graphical user interface 245. The rejection criteria folder tab allows a user to define criteria for rejecting xDRs. In the illustrated example, the user has specified that an xDR may be rejected if the CIC value is 0, the start date is equal to null, or the OPC is equal to null.

Figure 12:
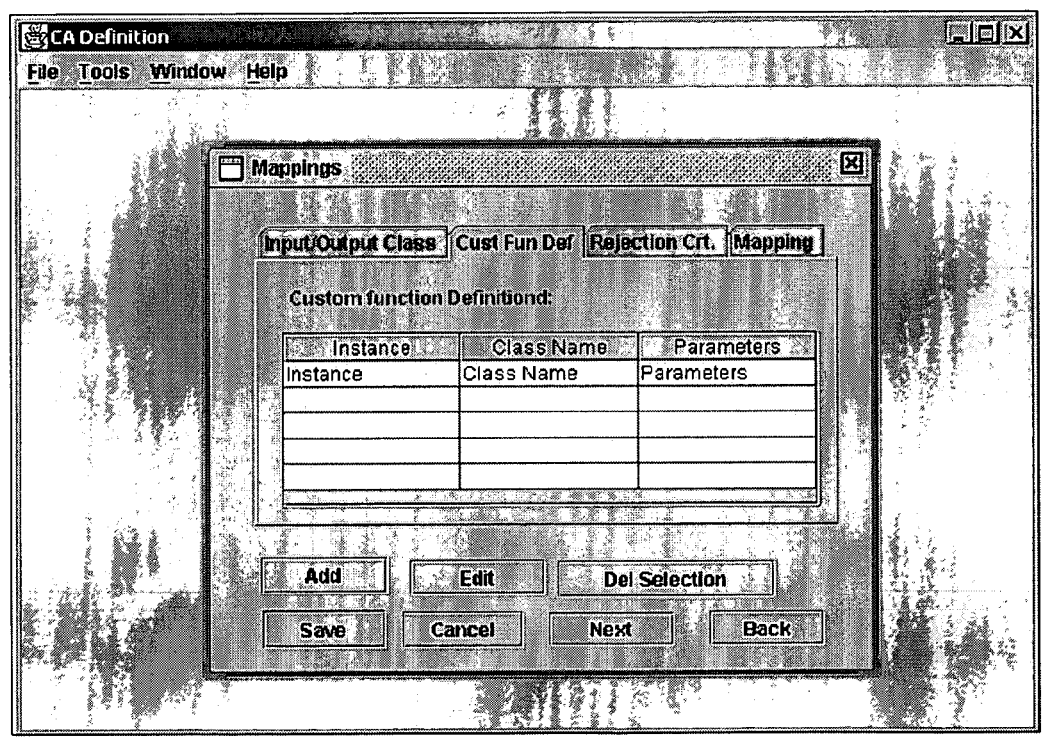

FIG. 12 illustrates an example of a customized function definition folder tab that may be presented by graphical user interface 245. The customized function definition folder tab allows a user to specify a customized function definition by inputting appropriate values in a table. The values include an instance to which the customized function will be applied, a class name corresponding to the input xDR dictionary, and parameters that will be used as input to the function.

Figure 13:
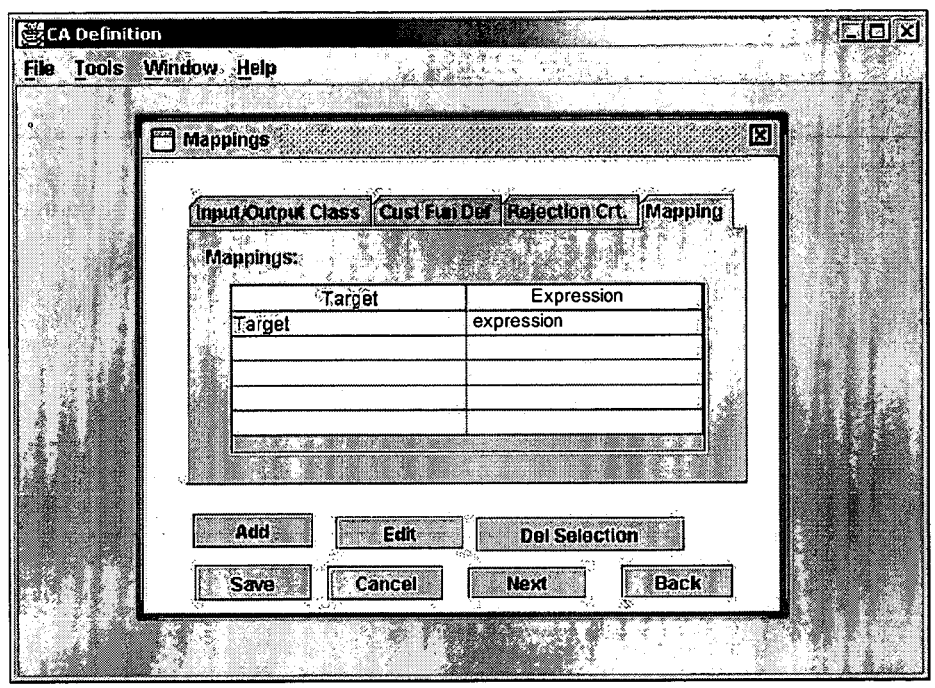

FIG. 13 illustrates an exemplary mapping folder tab that may be presented by graphical user interface 245. The mapping folder tab allows the user to specify an output field (target) and an expression for creation of new output. For example, the output field may be a call duration, and the expression may be end time minus start time.

Figure 14:
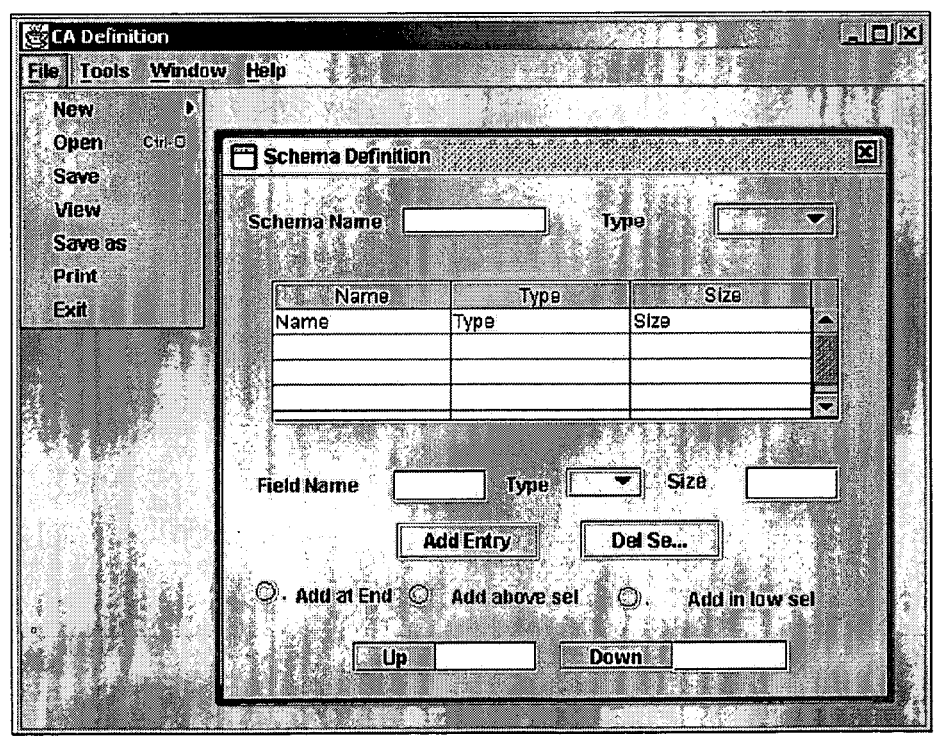
Figure 18:
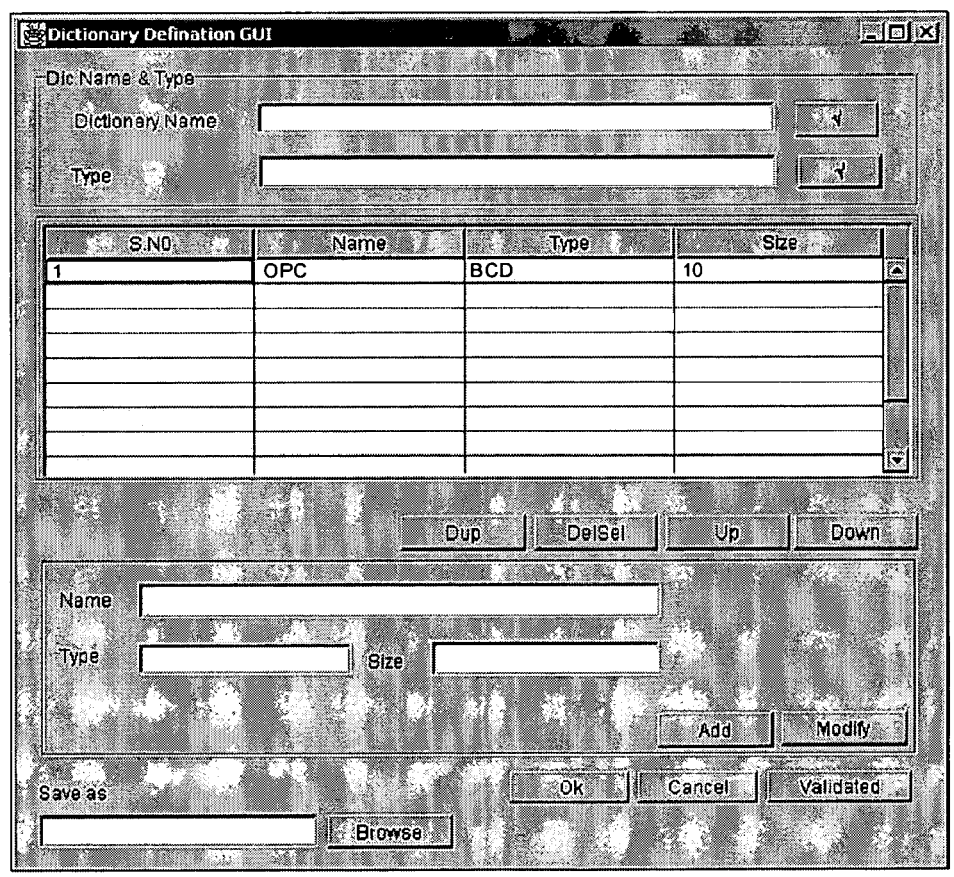
FIG. 18 is a computer screen shot illustrating an exemplary screen for defining a telecommunications detail record dictionary according to an embodiment of the subject matter described herein.

FIG. 14 illustrates an exemplary schema definition screen that may be presented by graphical user interface 245. Schema definition screen allows the user to define the I/O format of a vendor's xDRs that will be placed in the XML-formatted configuration file. Exemplary elements that may be defined include elements that can appear in an xDR and the names, sizes, and types of the elements. These elements will form the input or output data dictionaries described above. FIG. 18, which will be described below, provides an alternate example of a screen that can be used to define dictionary fields.

Figure 15:
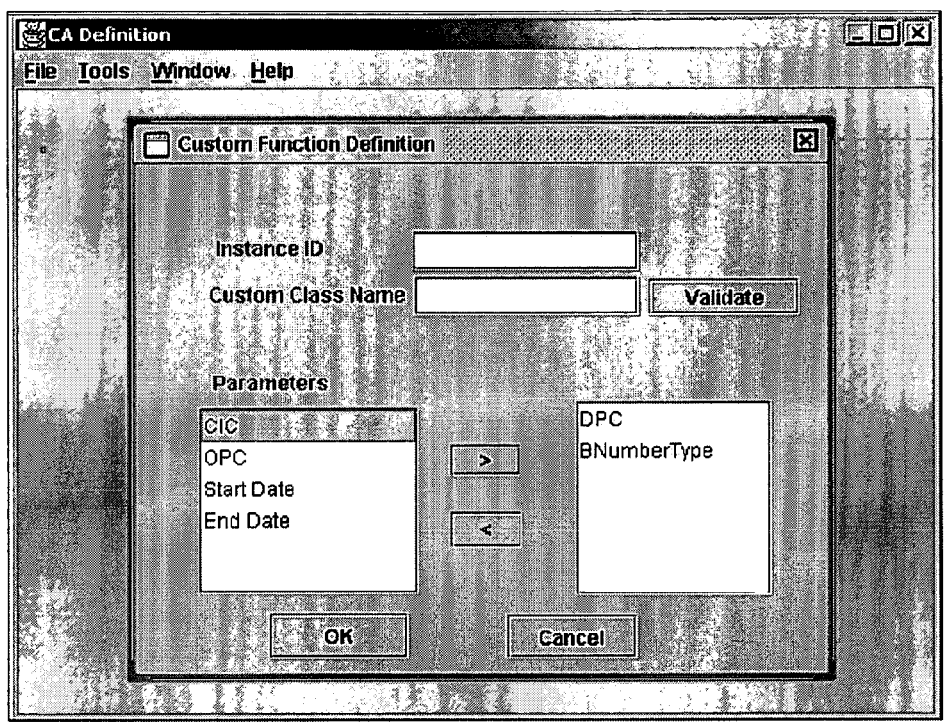

FIG. 15 illustrates an exemplary custom function definition screen that allows a user to define a custom function. In the illustrated example, the custom function definition screen allows the user to define customized functions. This screen is accessed when the user selects the add button in FIG. 13. As illustrated in FIG. 15, the user is allowed to select parameters to be included in the customized function, the instance ID, and the custom class name.

Figure 16:
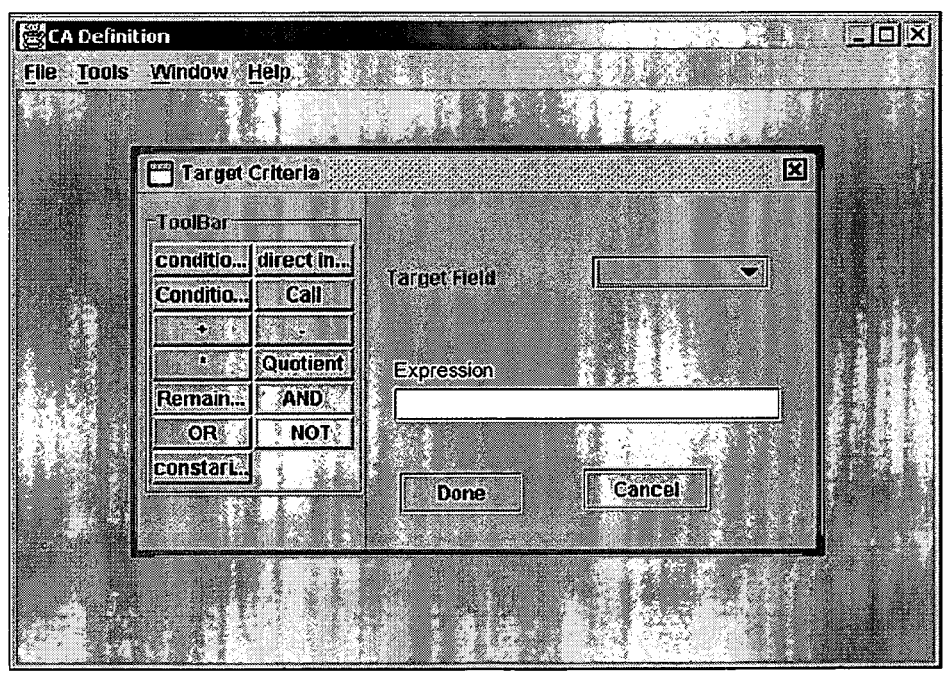

FIG. 16 illustrates an exemplary target criteria screen that may be presented by graphical user interface 245 when the user selects the add entry button in the mapping configuration screen of FIG. 13. The target criteria allows the user to input in an expression indicating message criteria that will be accepted by the configurable adapter.

Figure 17:
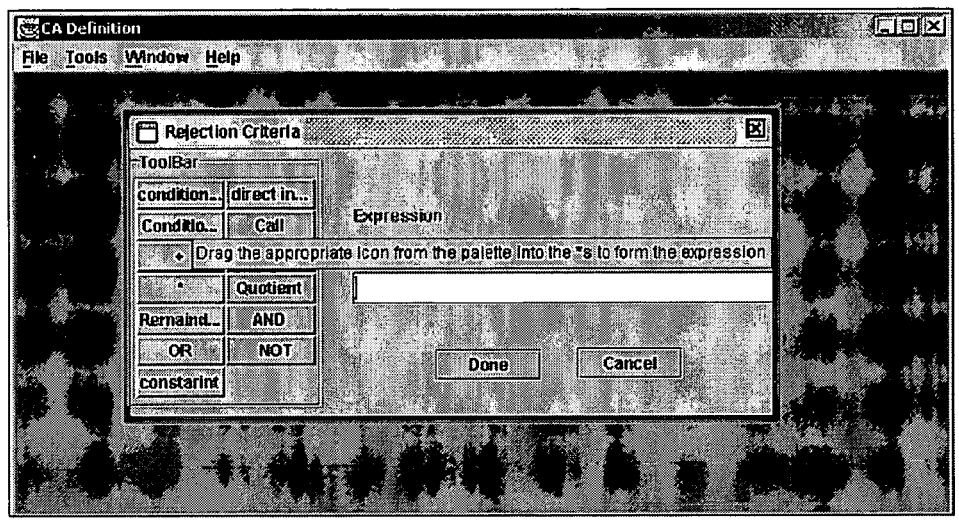

FIG. 17 illustrates an exemplary rejection criteria screen that may be presented to the user by a graphical user interface 245. The rejection criteria screen allows the user to input data or conditions that will be used to reject messages or xDRs. The criteria may include logical combinations of parameters and values to be compared to the corresponding parameters in input xDRs. An example of such criteria is illustrated in FIG. 11.

FIG. 18 illustrates an exemplary dictionary definition screen according to an embodiment of the subject matter described herein. In FIG. 18 the table allows a user to specify a parameter, a name for the parameter, a data type, and a size. Once the user populates the table, the user may save the dictionary under a file name and type (input or output). Once the dictionary is saved, it may be presented as an option to the user by the mapping configuration folder tab described above with respect to FIG. 7. By defining different input dictionaries, the user can quickly and easily create configurable adapter instances to process new data types without requiring that the user to re-write source code each time the input data format changes.

Figure 19:
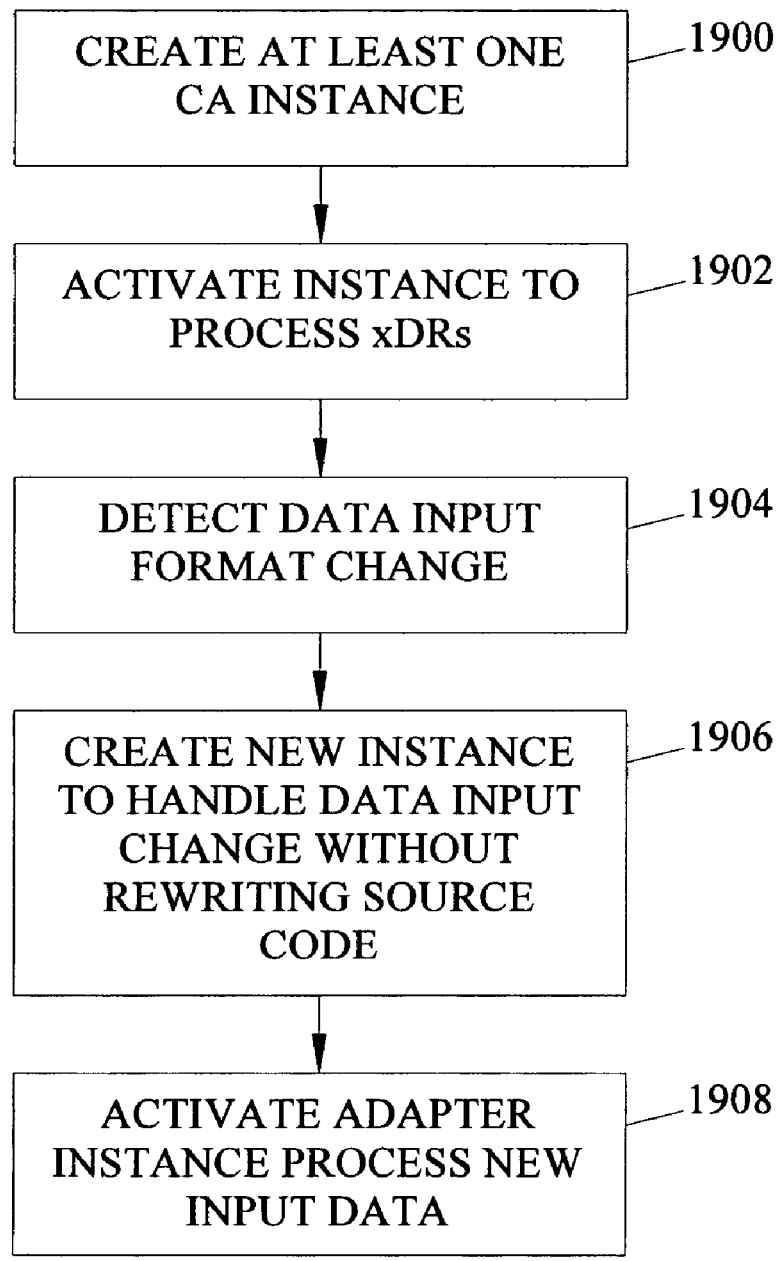
FIG. 19 is a flow chart illustrating exemplary steps for adapting a configurable adapter to changes in input data formats according to an embodiment of the subject matter described herein.

As stated above, the configurable adapter allows the user to create new adapter instances to accommodate different data input and output formats. FIG. 19 is a flow chart illustrating exemplary steps that may be performed in creating adapter instances in response to changes in input data format according to an embodiment of the subject matter described herein. Referring to FIG. 19, in step 1900, a user creates at least one configurable adapter instance by selecting the appropriate parameters using the graphical user interface and compiling the configuration file into an executable file. In step 1902, once the instance is created the user activates the instance to process xDRs. In step 1904, the user detects an input data format change. This step may be performed manually when the user is notified that new probe hardware or software is coming into service. In step 1906, the user creates a new instance to handle the input data change without rewriting the adapter source code. The user simply goes through the steps of selecting the appropriate fields and mappings using the graphical user interface and creates the configuration file. The configuration file is automatically converted into source code and compiled into a new adapter instance. In step 1908, the user activates the new adapter instance to process the new input data.

As stated above, another aspect of the subject matter described herein is sequencing xDRs or messages to be output to an application in a sequenced manner. xDRs or messages can be received out of sequence due to different processing delays at different probes or by different degrees of network congestion between the probes and the configurable adapter. In some applications, it is desirable that xDRs be forwarded to the applications in real time or near real time. In order to ensure that all xDRs or messages have been received and properly ordered, it may be necessary to wait for a predetermined time period before sending the xDRs or messages to the application to ensure that all messages have been received and sequenced. However, this wait period is preferably not too long because it reduces the real time nature of the xDRs or message feed.

Figure 20:
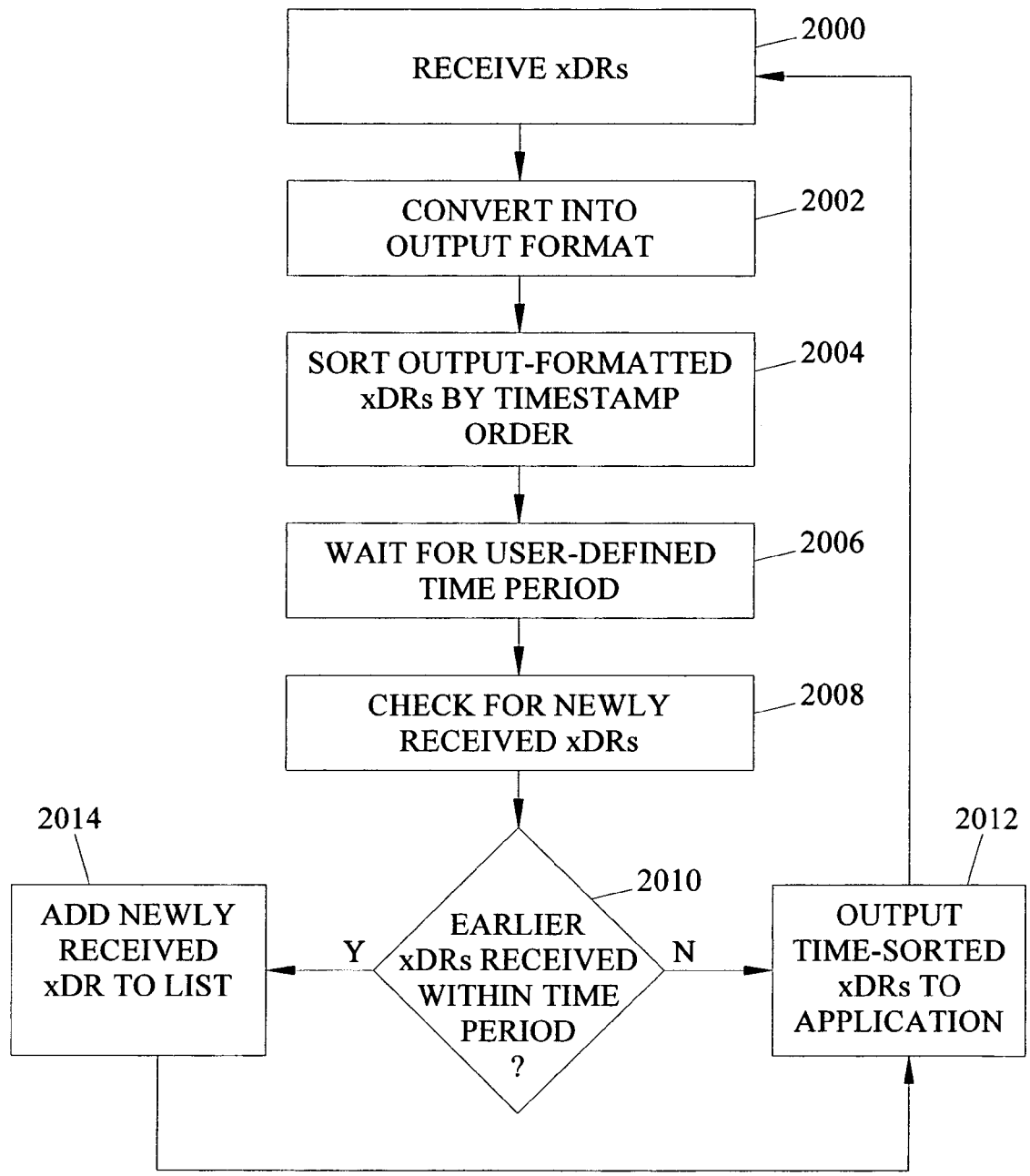
FIG. 20 is a flow chart illustrating exemplary steps for sequencing telecommunications detail records according to an embodiment of the subject matter described herein.

FIG. 20 is a flow chart illustrating exemplary steps that may be performed by a configurable adapter instance in sequencing xDRs messages according to an embodiment of the subject matter described herein. Referring to FIG. 20, in step 2000, the configurable adapter receives xDRs. In step 2002, the adapter instance converts the xDRs into the appropriate output format. In step 2004, the adapter sorts the output formatted xDRs by timestamp order. In step 2006, the adapter instance waits for a user defined time period. In step 2008, the adapter instance determines whether xDRs with earlier timestamps have been received within the time period. In step 2010, if earlier xDRs have not been received within the time period, control proceeds to step 2012 where the time sorted xDRs are output to the network monitoring application. If, on the other hand, xDRs that have an earlier timestamp have been received within the time period, control proceeds to step 2014 where the newly received xDR is added to the list in the location according to its timestamp. Control then proceeds to step 2012 where the time sorted xDRs are output to the network monitoring application.

Thus, as described, the subject matter described herein allows a user to easily define adapter instances that process data from different probes and in different formats without requiring that the user have detailed programming knowledge. The user simply creates a configuration file via a graphical user interface. The configuration file is automatically converted in the source code, which is already converted into an executable code to process new data formats.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A computerized system for processing telecommunications detail records, the system comprising:
   (a) a network-side input/output interface for receiving a plurality of data streams from a plurality of network probes in communication with one or more telecommunication networks, the data streams including telecommunications detail records and being transmitted in heterogeneous input formats, wherein the input format created by a first network probe is different from the input format created by a second network probe;
   (b) a mapping and format configuration module for defining one or more data mappings from one or more of the heterogeneous input formats to one or more output formats; and
   (c) a plurality of adapter instances in electronic communication with the network-side input/output interface for applying the defined data mappings to the received data streams and producing a plurality of output data streams such that the output data streams are formatted according to at least one of the one or more output formats, wherein the plurality of adapter instances includes a first adapter instance for processing the input format created by the first network probe and a second adapter instance for processing the input format created by the second network probe.

2. The system of claim 1 wherein the network-side input/output interface includes a file system interface module for interfacing with a file system of the one or more network probes.

3. The system of claim 1 wherein the network-side input/output interface includes a socket interface for receiving messages copied by the one or more network probes in real time.

4. The system of claim 1 wherein the network-side input/output interface includes a database interface for interfacing with a database subsystem of the network probes.

5. The system of claim 1 wherein the mapping and format configuration module is adapted to allow the user to define mappings between fields and input telecommunications detail records and output telecommunications detail records and wherein the adapter instances are adapted to implement the mappings specified by the mapping and format configuration module.

6. The system of claim 1 wherein the mapping and format configuration module is adapted to allow the user to define operations to be performed on input data fields and wherein the adapter instances implement the operations specified by the user via the mapping and format configuration module.

7. The system of claim 1 comprising a rules engine for converting the mappings input by the user via the mapping and format configuration module into the adapter instances.

8. The system of claim 7 wherein the rules engine is adapted to convert mappings entered by the user in text format into source code format and to compile the source code into the adapter instances.

9. The system of claim 1 comprising:
   (a) a synchronizer for combining the output data streams into a single output data stream, the single output stream containing telecommunications detail records ordered according to at least one parameter; and
   (b) an application-side input/output interface for transmitting the synchronized data stream to an application.

10. The system of claim 9 wherein the synchronizer is adapted to wait for a user-specified time period before forwarding the single output data stream to the application-side input/output interface and to re-order telecommunications detail records received out of order during the time period.

11. The system of claim 1 wherein the mapping and format configuration module is adapted to allow a user to create a plurality of different adapter instances to process the heterogeneous input formats.

12. A computerized method for processing telecommunications detail records, the method comprising:
   (a) receiving a plurality of data streams from a plurality of network probes in communication with one or more telecommunications networks, the data streams including telecommunications detail records and being transmitted in heterogeneous input formats, wherein the input format created by a first network probe is different from the input format created by a second network probe;
   (b) defining one or more data mappings from one or more of the heterogeneous input formats to one or more output formats, wherein defining one or more data mappings includes defining a first adapter instance for processing the input format created by the first network probe and a second adapter instance for processing the input format created by the second network probe; and
   (c) applying the defined data mappings to the received data streams and producing one or more output data streams such that the output data streams are formatted according to at least one of the one or more output formats, wherein applying the data mappings includes using the first adapter instance to process the input data format created by the first network probe and using the second adapter instance to process the input data format created by the second network probe.

13. The method of claim 12 wherein receiving a plurality of data streams includes receiving a plurality of data streams from network probes of different vendors.

14. The method of claim 12 wherein receiving a plurality of data streams includes receiving a plurality of data streams from network probes of the same vendor.

15. The method of claim 12 wherein receiving a plurality of data streams includes receiving the data streams from file systems of the network probes.

16. The method of claim 12 wherein receiving a plurality of data streams includes receiving a plurality of data streams from socket interfaces of the network probes.

17. The method of claim 12 wherein receiving a plurality of data streams includes receiving a plurality of data streams from database subsystems of the network probes.

18. The method of claim 12 wherein defining one or more data mappings includes defining mappings between input telecommunications detail record data fields and output telecommunications detail records data fields.

19. The method of claim 12 wherein applying the defined data mappings to the received data streams includes automatically converting data mappings received from the user in text format to executable format.

20. The method of claim 19 wherein automatically converting the mappings includes converting the mappings from text format to source code format and converting the source code to executable code.

21. The method of claim 12 comprising:
(a) combining the output data streams into a single output data stream, the single output data stream containing telecommunications detail records ordered according to at least one parameter; and
(b) transmitting the single output data stream to an application.

22. The method of claim 21 wherein combining me output data streams into a single output data stream includes waiting for a predetermined time period to ensure that all messages or telecommunications detail records in a particular stream sequence have been received.

23. The method of claim 12 wherein applying the defined data mappings comprises:
(i) receiving input from a user regarding the defined data mappings;
(ii) creating a configuration file based on the defined data mappings;
(iii) automatically converting the configuration file into the first adapter instance; and
(iv) using the first adapter instance to process a first received data stream of the plurality of received data streams.

24. The method of claim 23 comprising repeating steps (i)-(iv) to create the second adapter instance to process a second received data stream of the plurality of data streams, the second received data stream having a different data format than the first received data stream.

25. A method for providing a configurable network adapter, the method comprising:
(a) creating a plurality of adapter instances to process telecommunications detail records received from different network probes that generate data in different formats, when the plurality of adapter instances include a first adapter instance to process data of a first format generated by a first network probe and a second adapter instance to process data of a second format generated by a second network probe;
(b) activating the adapter instances to process the telecommunications detail records received from the probes; and
(c) in response to an input data format change in the telecommunications detail records received from one of the probes, creating a new adapter instance to handle the input data format change, wherein creating a new adapter instance includes defining a data input dictionary corresponding to the new data format and mappings from the data input dictionary to an output format, and automatically converting the input dictionary and the mappings into the new adapter instance.

26. The method of claim 25 wherein defining a data input dictionary and mappings comprises:
(a) prompting a user for input data formats and mappings;
(b) storing the input received from the user in a configuration file;
(c) automatically converting the configuration file into the new adapter instance.

27. The method of claim 26 wherein automatically converting the configuration file into the new adapter instance includes:
(a) converting the configuration file into a source code file; and
(b) compiling the source code file into the new adapter instance.

28. The method of claim 27 wherein converting the configuration file into a source code file includes:
(a) reading text in the configuration file; and
(b) extracting source code corresponding to the text from source code libraries.

29. A method for automatically generating adapter instances for processing telecommunications detail records generated by different network probes, the method comprising:
(a) prompting a user for data regarding first and second input telecommunications detail record formats, at least one output telecommunications detail record format, and mappings between the first and second input and at least one output telecommunications detail record formats, wherein the first input telecommunications detail record format is created by a first network probe, the second telecommunications detail record format is created by a second network probe, and the first and second telecommunications detail record formats are different;
(b) receiving the data from the user and creating first and second configuration files based on the data; and
(c) automatically converting the configuration files into first and second executable adapter instances for respectively processing telecommunications detail records having the first and second telecommunications detail record formats and for mapping the first and second telecommunications detail record formats to the at least one output data format using the mappings received from the user.

30. The method of claim 29 wherein prompting the user for data includes prompting the user for data via graphical user interface.

31. The method of claim 29 wherein creating the configuration files includes creating XML-formatted configuration files.

32. The method of claim 29 wherein automatically converting the configuration files includes:
(a) extracting source code corresponding to the data received from the user from stored source code libraries; and
(b) compiling the source code into executable adapter instances.

* * * * *